United States Patent [19]

Julian

[11] Patent Number: 4,934,958

[45] Date of Patent: Jun. 19, 1990

[54] BATTERY CABLE TERMINATION

[76] Inventor: Kenneth A. Julian, 409 Suffolk La., Oak Brook, Ill. 60521

[21] Appl. No.: 386,246

[22] Filed: Jul. 28, 1989

[51] Int. Cl.$^5$ .................................... H01R 11/00
[52] U.S. Cl. .................................... 439/504; 439/754; 439/766; 439/756
[58] Field of Search .................... 439/502–504, 439/754–756

[56] References Cited

U.S. PATENT DOCUMENTS 3,605,065  9/1971  Shannon ............................. 439/755
4,643,511  2/1987  Gawlik et al. ..................... 439/766
4,747,793  5/1988  Fukuda et al. ..................... 439/754

Primary Examiner—P. Austin Bradley
Attorney, Agent, or Firm—Edmond T. Patnaude

[57] ABSTRACT

The present invention relates in general to battery cables and terminations for connecting electric cables to the terminals of batteries, and it relates more particularly to a new and improved termination for use with multiple connector cables and which incorporates an auxiliary stud which does not interfere with the fill holes of the associated battery.

3 Claims, 1 Drawing Sheet

BATTERY CABLE TERMINATION

BACKGROUND OF THE INVENTION

In U.S. Pat. No. 4,473,264 there is described a battery cable termination having an auxiliary stud for connecting auxiliary equipment tot he associated battery. In that termination the auxiliary stud is located in line with the associated cable as is the main connector which is adapted to be connected to the battery terminal. As a result of this construction this termination is not well suited for use with the types of batteries having fill holes on the top because the termination has to be disconnected from the battery before the fill caps can be removed for filling of the battery.

Battery cable terminations wherein the termination extends transversely from he cable have been used with fill type batteries. When these terminations are used, the cables extend along one side of the battery with only the termination extending over the top of the battery so as not to cover the fill holes. However, auxiliary studs have not been used with these terminations because such studs would interfere with the removal of the caps on the fill holes.

SUMMARY OF THE INVENTION

Briefly, there is provided in accordance with the present invention a new and improved battery cable termination having a combined battery stud connector and auxiliary stud assembly extending transversely from the cable. A protuberance in the form of a knob is provided on the bottom of the assembly directly below the auxiliary stud and in line therewith to space the body of the assembly from the top of the associated battery. Locating the protuberance in line with the auxiliary stud facilitates the manufacture of the device and has been found to make it easier to remove a fill hole cap positioned in adjacency with the assembly.

DESCRIPTION OF THE DRAWING

Further objects and advantages and a better understanding of the present invention will be had by reference to the following detailed description taken in connection with the accompanying drawings wherein.

DETAILED DESCRIPTION OF A PREFERRED EMBODIMENT OF THE INVENTION

Figure 1:
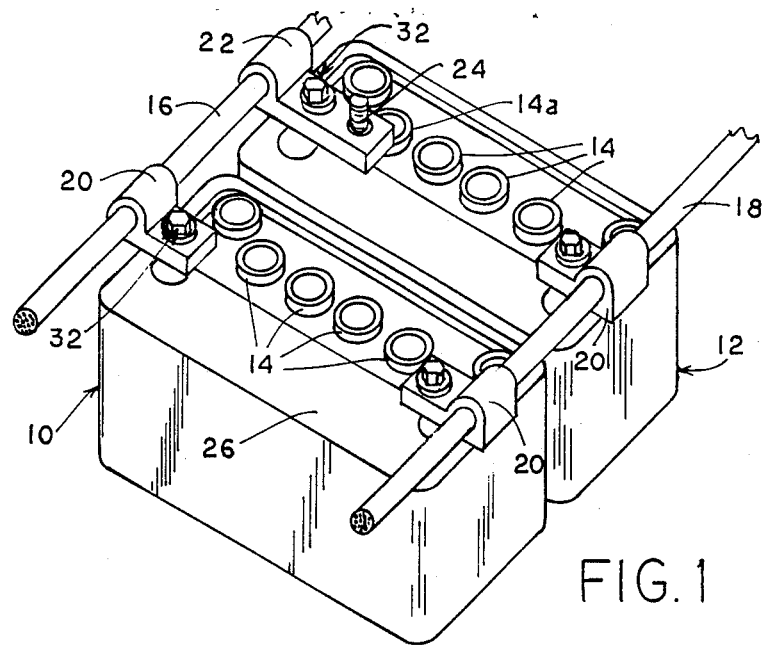
FIG. 1 is a perspective view of a plurality of batteries interconnected by cables, and showing two terminations embodying the present invention.
Figure 2:
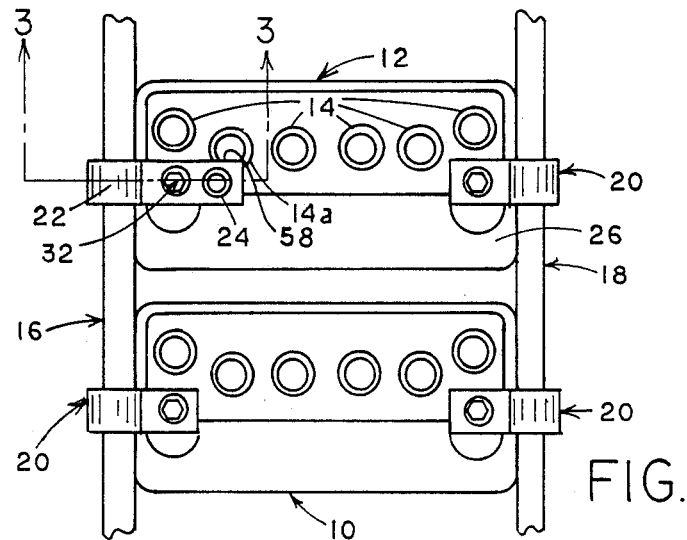
FIG. 2 is a top view of the battery combination of FIG. 2.

Referring particularly to FIGS. 1 and 2, there is shown a pair of conventional wet cell batteries 10 and 12 respectively having a pair of terminals and a plurality of fill holes opening into the respective cells of the associated battery. The fill holes are respectively covered by fill caps 14 which must be removed from the fill holes in order to fill the cells with a liquid electrolyte and to replace the water which evaporates from the electrolyte.

The batteries 10 and 12 are connected in parallel by means of a pair of electrically conductive cables 16 and 18. Each of the cables 16 and 18 includes a plurality of terminations which connect the associated cable to one of the battery terminals. As may be seen in FIGS. 1 and 2, three identical terminations 20 connect the cable to the ground terminals of the batteries 10 and 12 and to the hot terminal 32 of the battery 10. A termination 22 connects the cable 16 to the hot terminals of the battery 12. The termination 22 includes an auxiliary terminal stud 24 to which other electrical equipment may be connected to the batteries by other cables (not shown).

Figure 3:
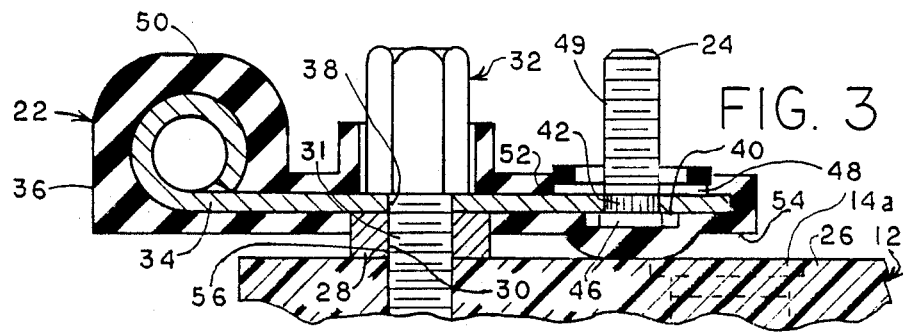
FIG. 3 is a cross-sectional view taken along the line 3—3 of FIG. 2.

The cable 16 extends along one side of the batteries a short distance above the plane of the top surface 26 of the batteries as shown in FIG. 3 and the terminations are aligned with the battery terminals. In FIG. 3 the hot terminal of the battery 12 is shown to include an upstanding metal bushing 28 having an internally threaded hole 30 for receiving the threaded shank portion 31 of a hexhead bolt 32 which connects the termination 22 to the battery.

The termination 22 may be seen in FIG. 3 to include a metal plate 34 having one end wrapped around a stranded wire portion 36 of the cable 16. Preferably, the plate 34 is formed of copper and is compressed against the wires 36 and soldered thereto to provide a good mechanical and electrical connection. The plate 34 is provided with an aperture 38 which is adapted to be aligned with the hole 30 in the terminal bushing 28. In addition, the plate 34 is provided with a second hole 40 which receives a knurled shank portion 42 of the auxiliary terminal stud 24. The stud 24 is provided with a hexhead 46 which underlies the plate 34 and an internally threaded washer 48 is threaded onto the threaded upper end portion 49 of the stud 24 to compress the plate 34 between the head portion 46 of the stud 24 and the washer 48. The stud 24, the plate 34 and the washer 48 are soldered together to provide a subassembly in which the cable 36, the plate 34, the stud 24, and the washer 48 are mechanically and electrically connected together. Thereafter, the outer rubber or plastic insulating covering 50 is molded over the metallic subassembly.

The insulating covering 50 includes a protrusion or button 52 which extends a substantial distance from the adjoining surface 54 includes a opening 56 for tightly receiving the battery terminal bushing 28.

As may best be seen in FIG. 2, the terminal of the battery is not aligned with the fill openings of the battery, but is relatively close to the next adjacent cap 14a. Because of the space between the bottom surface 54 of the termination and the top surface 26 of the battery 12, and the outer configuration of the covering 50 wherein the peripheral edge 58 overlies the cap 14a only to a slight extent, it is possible to remove the cap 14a from the associated fill opening without disconnecting the termination 22 from the battery terminal.

While the present invention has been described in connection with a particular embodiment thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. A termination for connecting an electric cable to a terminal of a battery having fill holes and associated removable caps on the top thereof located in proximity to said terminal, comprising in combination an elongate metal plate having a hole therethrough for receiving a threaded member for connection to one terminal of a battery, an auxiliary terminal stud connected to said plate in spaced relationship with said hole and extending upwardly from said plate, an insulating cover molded directly over said plate with said hole exposed and said auxiliary stud extending therefrom, said cover including a portion protruding in a direction away from said auxiliary stud to space said termination from the top surface of a battery to which said termination is connected, and a strand metal cable around which said plate is clamped and soldered to said plate at the end of said plate remote from said auxiliary stud, said cable extending in a direction transverse to the longitudinal axis of said plate.

2. A termination according to claim 1, wherein said stud comprises a threads shank portion, a head disposed on one side of said plate in abutment therewith, a washer threaded on said shank portion and abutting the other side of said plate.

3. A termination according to claim 2 wherein said stud is press fitted into another hole in said plate.

* * * * *